United States Patent [19]

Marchioro

[11] 4,292,716
[45] Oct. 6, 1981

[54] CONTROLLED DEFLECTION ROLL
[75] Inventor: Ignazio Marchioro, I-Schio, Italy
[73] Assignee: Escher Wyss Limited, Zürich, Switzerland
[21] Appl. No.: 86,538
[22] Filed: Oct. 19, 1979
[30] Foreign Application Priority Data
  Oct. 25, 1978 [CH] Switzerland .................. 11030/78
[51] Int. Cl.³ ............................................. B21B 13/02
[52] U.S. Cl. ............................................. 29/116 AD
[58] Field of Search ...... 29/116 AD, 113 AD, 116 R, 29/113 R; 100/162 B, 170

[56] References Cited
U.S. PATENT DOCUMENTS
4,047,273  9/1977  Biondetti .................. 29/116 AD
4,090,282  5/1978  Lehmann .................. 29/116 AD Primary Examiner—Peter P. Nerbun
Attorney, Agent, or Firm—Werner W. Kleeman

[57] ABSTRACT

A controlled deflection roll contains a stationary support and a roll shell rotatable thereabout. The support has a central bore for the infeed of pressurized fluid medium. In the central bore there are located partition walls and infeed tubes, which deliver to individual sections of the stationary support the pressurized fluid medium at different pressures. The first section of the bore at one end of the stationary support serves for the withdrawal of the medium from the intermediate space or chamber between the roll shell and the support. The partition walls are held in spaced relationship by spacer tubes and secured by means of a tie or tension rod. Each partition wall consists of two telescopically displaceable parts, conjointly limiting a groove for a seal, and the seal can be pressed against the wall of the central bore by drawing together the telescopically displaceable parts.

5 Claims, 7 Drawing Figures

CONTROLLED DEFLECTION ROLL

BACKGROUND OF THE INVENTION

The present invention relates to a new and improved construction of a controlled deflection roll, also known in the art as a roll having bending or sag compensation.

Generally speaking, the controlled deflection roll of the present development is of the type comprising a stationary support and a roll shell mounted to be rotatable about the stationary support. The roll shell is supported upon pressure or support elements which can be activated by a pressurized fluid medium, these pressure or support elements forming a number of pressure zones to which the pressurized fluid medium can be infed, at different pressures, by infeed tubes or pipes arranged in a central bore of the stationary support. The infeed tubes or pipes are connected at an end of the stationary support with supply lines or conduits. Partition walls are arranged in the bore of the stationary support, these partition walls separating the sections or portions of the bore from one another which are correlated with the individual pressure zones and in which there terminates in each case one of the tubes. The infeed tubes are arranged to extend next to one another.

Controlled deflection rolls of this type are known from U.S. Pat. Nos. 4,047,273, 4,048,701 and German Patent Publication No. 2,657,061. With the controlled deflection roll taught in U.S. Pat. No. 4,047,273 the infeed of hydraulic pressurized fluid medium is accomplished by concentrically arranged infeed tubes or pipes. Although this heretofore known construction has proved to be satisfactory, nonetheless, difficulties exist if the controlled deflection roll has a greater number of zones, and therefore, there must be arranged concentrically with respect to one another a great number of tubes.

According to U.S. Pat. No. 4,048,701 an intermediate space or compartment between an expanded end section of the bore and a tube inserted therein serves for the withdrawal of the liquid out of the interior of the controlled deflection roll.

According to German Patent Publication No. 2,657,061 there is proposed an arrangement of parallelly adjacent tubes for the infeed of the pressurized fluid medium, along which there can be adjustably positioned the partition walls.

Both embodiments are relatively complicated. One such embodiment requires a widened bore and an additional tube, the other an adjustment mechanism, by means of which it is possible to retain the partition walls at small spacing.

SUMMARY OF THE INVENTION

Therefore, with the foregoing in mind, it is a primary object of the present invention to provide a new and improved construction of controlled deflection roll which is not afflicted with the aforementioned drawbacks and shortcomings of the prior art proposals.

Another and more specific object of the present invention aims at the provision of a new and improved construction of controlled deflection roll of the previously mentioned type, which, on the one hand, enables providing a larger number of infeed tubes than possible with the concentric arrangement described, and, on the other hand, allows for a much simpler construction.

Now in order to implement these and still further objects of the invention, which will become more readily apparent as the description proceeds, the controlled deflection roll of the present development is manifested by the features that in the first section of the bore, located between one end of the stationary support and the first partition wall, the intermediate space between the outer walls of the tubes and the inner wall of the bore serves for the withdrawal of the medium out of the intermediate space between the roll shell and the stationary support at the controlled deflection roll.

In this way there is realized a decisive simplification of the construction of the controlled deflection roll in that, for the infeed of the pressurized fluid medium, as well as also for the withdrawal of the medium out of the controlled deflection roll, there can be beneficially employed the same central bore having constant diameter. Also the bending rigidity and the strength of the roll support is thus favorably affected in that, for the withdrawal of the pressurized fluid medium there is not required any widening of the central bore.

Moreover, as has already been taught to the art from U.S. Pat. No. 4,047,273, advantageously each of the partition walls can consist of two mutually displaceable parts or components which collectively delimit a groove for a seal or seal means. If the parts are located in an extended position or state, then the seal located in the groove has a smaller diameter, and thus, is not damaged upon insertion into the bore by possibly protruding burrs or the like. As soon as the seals have been located in their proper positions, then the telescopically movable parts of the partition wall can be retracted or drawn together with the aid of the tie rod or tension member or equivalent structure, so that the grooves again narrow and the seals are pressed against the wall of the bore. During pulling out or retraction of the infeed tubes together with the partition walls the operations are carried out in the reverse sequence.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
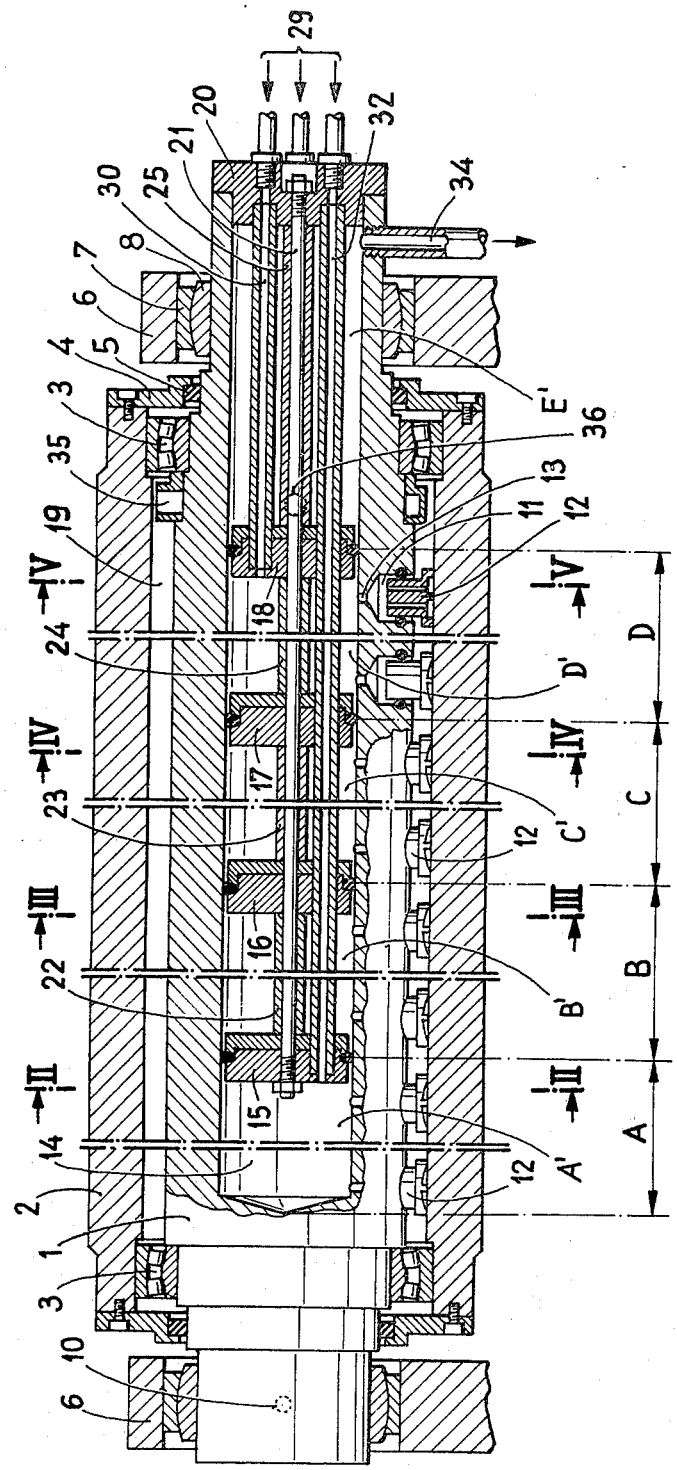
FIG. 1 is a fragmentary sectional view of a controlled deflection roll constructed according to the invention.
Figure 2:
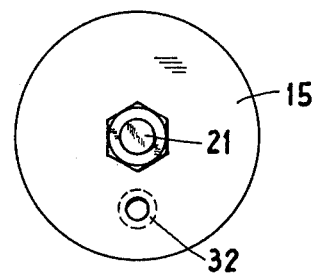
FIG. 2 is a view of the last partition wall thereof, corresponding to a fragmentary sectional view taken along the line II—II of FIG. 1.

Describing now the drawings, in FIG. 1 there is shown an exemplary embodiment of controlled deflection roll of the type known in principle, for instance, from U.S. Pat. No. 3,802,044. This controlled deflection roll will be seen to comprise a stationary support or carrier 1 about which there is rotatably mounted, in any suitable fashion, a roll shell 2. This roll shell 2 is shown mounted in the arrangement of FIG. 1 at its ends upon roller bearings 3 or other suitable anti-friction bearing means, but however, also can be movable, in relation to the stationary support 1, to carry out possible lifting movements in the manner disclosed in U.S. Pat. No. 3,885,283. At the ends of the roll shell 2 there are arranged the closure plates or discs 4 containing the seals 5. The ends of the stationary support 1 are supported at the side parts or elements 6 of a not further illustrated frame arrangement of a rolling mill. To render possible bending-through of the stationary support 1, when exposed to load, the ends of the stationary support 1 are supported in spherical bearing shells 7 and 8, and the stationary support 1 is secured against rotation, for instance by means of suitable pins or plugs 10 or equivalent structure.

As is well known from the aforementioned U.S. Pat. No. 3,802,044 there are formed in the stationary support 1 the bores 11 in which there are sealingly guided piston-like hydrostatic pressure or support elements 12. As to the construction and mode of operation of these pressure or support elements 12, which does not constitute specific subject matter of the present invention, reference may be had to the aforementioned U.S. Pat. Nos. 3,802,044 and 3,885,283, the disclosure of which is incorporated herein by reference. In this regard it is sufficient to state that the pressure or support elements 12 are pressed against the inner wall of the roll shell 2 by the action of the hydraulic pressure of the pressurized fluid medium which is effective in the bores 11, and thus, the roll shell 2 is supported upon the stationary support 1. The bores 11 are connected, by connection bores 13, with a central inner bore 14 of the stationary support 1, within which there is located a hydraulic pressurized fluid medium at regulated pressures, serving to exert the desired pressure forces of the pressure or support elements 12. In order to obtain special effects, such as for instance a uniform or irregular distribution of the contact force of the controlled deflection roll along its length, such roll is divided into zones A, B, C and D. These zones A, B, C, and D correspond to sections A', B', C', and D' of the bore 14, which are separated from one another by partition walls 15, 16, 17 and 18 respectively. Between the partition wall 18 and a cover member 20, closing the bore 14 at the end of the stationary support 1, there is located a section E' of the bore 14.

Figure 5:
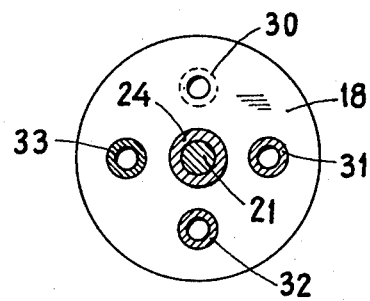

The partition walls 15, 16, 17 and 18 are connected with the cover member or closure 20 by a tie rod or tension member 21. Between the partition walls 15, 16, 17 and 18 there are located the spacer tubes or spacer elements 22, 23 24 and 25, respectively, which bear in each instance against the related partition walls or, as the case may be, the partition wall 18 and the cover member 20. Additionally, there are provided infeed tubes or pipes 30, 31, 32 and 33, as best seen by referring to FIG. 5, which are connected at the cover member 20 at an appropriate number of supply lines or conduits 29 carrying different pressures of the hydraulic medium.

Figure 3:
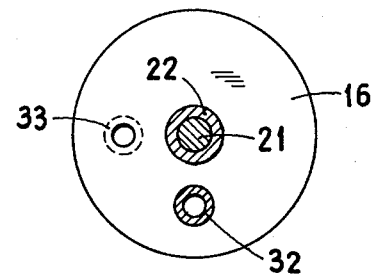
FIGS. 3, 4 and 5 are respective views of the partition wall, taken substantially at the section lines III—III IV—IV and V—V, respectively.
Figure 4:
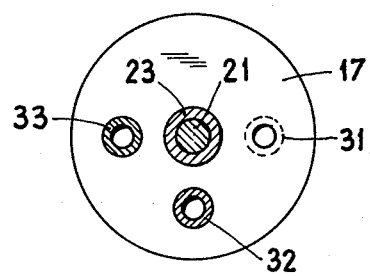

The infeed tube or pipe 30 leads from the cover member 20 to the partition wall 18 and opens at the section D' of the bore 14. The infeed tube or pipe 32 leads from the cover member 20 through the partition walls 18, 17, 16 and 15 and opens at the section A'. The tube 31, not particularly illustrated in FIG. 1, leads from the cover member 20 through the partition walls 18 and 17 and opens at the section C' of the bore 14, as best seen by referring to FIG. 4. The tube 33, likewise not shown in FIG. 1, leads through the partition walls 18, 17 and 16 and opens at the section B', as best recognized by reverting to FIG. 3.

The section E' of the bore 14 serves for the withdrawal of the hydraulic liquid or medium out of the intermediate space 19 between the stationary support 1 and the roll shell 2. For this purpose this section E' is connected with an outfeed or withdrawal line or conduit 34. The infeed of the hydraulic liquid to the section E' occurs by means of a bore 36 provided in the stationary support 1, equipped with a scoop or bucket ring 35, as the same is known from the aforementioned U.S. Pat. No. 4,048,701.

Figure 6:
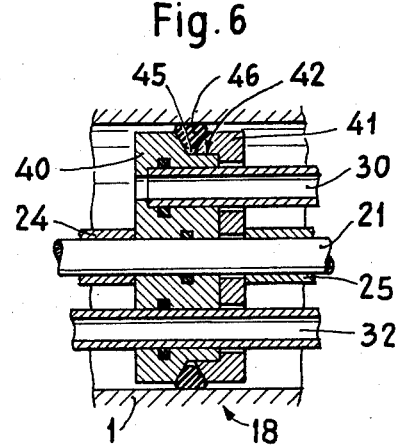
FIG. 6 is a sectional view, on an enlarged scale, of the partition wall shown in FIG. 5.
Figure 7:
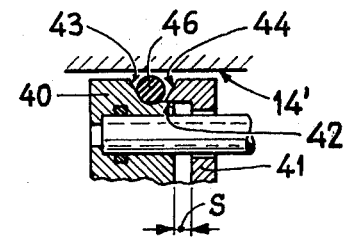
FIG. 7 is a sectional detailed view of the structure of FIG. 6, the parts of the partition wall being shown in spaced relationship from one another.

Continuing, FIGS. 6 and 7 show the construction of the partition walls based upon details of the partition wall 18, it is to be understood that the other partition walls with the exception of the number of tubes which extend therethrough are of similar construction. The partition wall 18 consists of two parts or elements 40 and 41 which are telescopically displaceable relative to one another along substantially cylindrical surfaces 42. The telescopically movable parts 40 and 41 contain conical surfaces 43 and 44, which conjointly form a groove 45 for a sealing ring 46.

If, as shown in FIG. 7, both of the telescopically movable parts or elements 40 and 41 are extended, i.e. drawn apart, and are located at a spacing S with respect to one another, then also the conical surfaces 43 and 44 are spaced to such an extent from one another that the sealing ring 46 bears upon the base of the groove 45 which is formed by the cylindrical surface of the part or element 40. The outer diameter of the sealing ring 46 is so small that it does not contact the inner wall 14' of the bore 14. Thus, the sealing ring 46, also when being introduced into the bore 14, cannot be damaged by protruding burrs or fins of the bores 13. Only after the partition walls 15, 16, 17 and 18 are located at their positions, is it possible, with the aid of the tie rod 21 and the spacer tubes 22, 23, 24 and 25, to move the parts 40 and 41 of the walls towards one another such that they bear upon one another according to the showing of FIG. 6. Consequently, the grooves 45 are narrowed such that the sealing rings 46 are pressed against the inner surface 14' of the bore 14 and the partition walls are sealed in relation to the bore 14.

For reasons of simplicity in illustration, in the drawings, there have only been shown four zones A, B, C and D having different pressures and therefore, only four infeed tubes or pipes 30, 31, 32 and 33. However, it should be expressly understood that the number of zones, and therefore, also the number of partition walls and infeed tubes can be considerably greater. It is also possible, for instance, to arrange the cover members 20 at both ends of a roll support and when using a larger number of zones to introduce the infeed tubes or pipes from both ends. Equally, it is also to be understood that the hydrostatic pressure or support elements 12 together with their bores 11 have only been illustrated as exemplary, and that the invention can be used also with controlled deflection rolls having different, similarly acting support elements, such as for instance, ledge-shaped constructed support elements.

While there are shown and described present preferred embodiments of the invention, it is to be distinctly understood that the invention is not limited thereto, but may be otherwise variously embodied and practiced within the scope of the following claims. Accordingly,

What I claim is:

1. A controlled deflection roll comprising:
   a stationary support;
   a roll shell;
   means mounting said roll shell for rotatable movement about said stationary support;
   said roll shell and said stationary support defining therebetween an intermediate space;
   a plurality of pressure elements, activatable by a pressurized fluid medium, for supporting the roll shell upon the stationary support;
   said stationary support having a central bore;
   infeed tubes arranged in said central bore;
   said pressure elements forming a number of pressure zones to which there is infed the pressurized fluid medium at different pressures by said infeed tubes arranged in the central bore of said stationary support;
   supply line means connected with said infeed tubes at an end of said stationary support;
   partition walls arranged in the bore of the stationary support;
   said partition walls separating from one another sections of the bore, each of which is correlated to individual ones of said pressure zones and into which open the infeed tubes;
   said infeed tubes extending in adjacent non-concentric relationship with respect to one another; and
   a first section of the bore, located between an end of the stationary support and a first one of said partition walls, containing an intermediate space between the outer walls of the infeed tubes and the inner wall of the bore for the withdrawal of the medium out of the intermediate space between the roll shell and the stationary support of the controlled deflection roll.

2. A controlled deflection roll comprising:
   a stationary support;
   a roll shell;
   means mounting said roll shell for rotatable movement about said stationary support;
   said roll shell and said stationary support defining therebetween an intermediate space;
   a plurality of pressure elements, activatable by a pressurized fluid medium, for supporting the roll shell upon the stationary support;
   said stationary support having a central bore;
   infeed tubes arranged in said central bore;
   said pressure elements forming a number of pressure zones to which there is infed the pressurized fluid medium at different pressures by said infeed tubes arranged in the central bore of said stationary support;
   supply line means connected with said infeed tubes at an end of said stationary support;
   partition walls arranged in the bore of the stationary support;
   said partition walls separating from one another sections of the bore, each of which is correlated to individual ones of said pressure zones and into which open the infeed tubes;
   said infeed tubes extending in adjacent relationship with respect to one another;
   a first section of the bore, located between an end of the stationary support and a first one of said partition walls, containing an intermediate space between the outer walls of the infeed tubes and the inner wall of the bore for the withdrawal of the medium out of the intermediate space between the roll shell and the stationary support of the controlled deflection roll;
   a closure cover member arranged at one end of the stationary support;
   spacer tubes for retaining the partition walls in spaced relationship with respect to one another; and
   tie rod means for securing said partition walls at said closure cover arranged at one end of the stationary support.

3. The controlled deflection roll as defined in claim 2, wherein:
   each partition wall comprises two mutually displaceable telescopic parts; and
   said telescopic parts collectively bounding a groove for receiving seal means.

4. A controlled deflection roll comprising:
   a stationary support;
   a roll shell;
   means mounting said roll shell for rotatable movement about said stationary support;
   said roll shell and said stationary support defining therebetween an intermediate space;
   pressure exerting means, activatable by a pressurized fluid medium, for supporting the roll shell upon the stationary support;
   said stationary support having a central bore;
   infeed tube means arranged adjacent one another and non-concentrically in said central bore;
   said pressure exerting means forming a number of pressure zones to which there is infed the pressurized fluid medium at different pressures by said infeed tube means arranged in the bore of said stationary support;
   supply line means connected with said infeed tube means at an end of said stationary support;
   partition walls arranged in the bore of the stationary support;
   said partition walls separating from one another sections of the bore, each of which is correlated to individual ones of said pressure zones and into which open the infeed tube means; and
   a first section of the bore, located between an end of the stationary support and a first one of said partition walls, containing an intermediate space between the outer walls of the infeed tube means and the inner wall of the bore for the withdrawal of the medium out of said intermediate space between the roll shell and the stationary support of the controlled deflection roll.

5. The controlled deflection roll as defined in claim 4, wherein:
   said adjacently arranged and non-concentric infeed tube means possess essentially the same diameter.

* * * * *